US011979563B2

(12) United States Patent
Li et al.

(10) Patent No.: US 11,979,563 B2
(45) Date of Patent: May 7, 2024

(54) METHOD FOR CODING INTRA-PREDICTION MODE, AND DEVICE FOR SAME

(71) Applicant: LG ELECTRONICS INC., Seoul (KR)

(72) Inventors: Ling Li, Seoul (KR); Seunghwan Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 18/216,248

(22) Filed: Jun. 29, 2023

(65) Prior Publication Data

US 2023/0344988 A1 Oct. 26, 2023

Related U.S. Application Data

(63) Continuation of application No. 17/979,642, filed on Nov. 2, 2022, now Pat. No. 11,750,801, which is a continuation of application No. 17/258,629, filed as application No. PCT/KR2019/007574 on Jun. 24, 2019, now Pat. No. 11,523,106.

(60) Provisional application No. 62/696,830, filed on Jul. 11, 2018.

(51) Int. Cl.
*H04N 19/105* (2014.01)
*H04N 19/132* (2014.01)
*H04N 19/159* (2014.01)
*H04N 19/176* (2014.01)

(52) U.S. Cl.
CPC ......... *H04N 19/105* (2014.11); *H04N 19/132* (2014.11); *H04N 19/159* (2014.11); *H04N 19/176* (2014.11)

(58) Field of Classification Search
CPC .. H04N 19/105; H04N 19/132; H04N 19/159; H04N 19/176; H04N 19/463; H04N 19/11; H04N 19/91
USPC ............................................. 375/240
See application file for complete search history.

(56) References Cited

U.S. PATENT DOCUMENTS

| 2013/0114707 A1* | 5/2013 | Seregin | H04N 19/11 |
| | | | 375/E7.243 |
| 2017/0332084 A1* | 11/2017 | Seregin | H04N 9/8045 |
| 2019/0387222 A1* | 12/2019 | Kim | H04N 19/593 |
| 2020/0120336 A1* | 4/2020 | Racape | H04N 19/91 |

* cited by examiner

*Primary Examiner* — Susan E. Torgerson
(74) *Attorney, Agent, or Firm* — Bryan Cave Leighton Paisner LLP

(57) ABSTRACT

A picture decoding method which is performed by a decoding apparatus according to an example of the present disclosure includes constructing a Most Probable Modes (MPM) list including intra prediction mode candidates for a current block based on neighboring blocks of the current block, decoding remaining mode information indicating one of remaining intra prediction modes other than the intra prediction mode candidates included in the MPM list from a bitstream, determining an intra prediction mode of the current block based on the decoded remaining mode information, generating prediction samples for the current block based on the determined intra prediction mode, and generating reconstructed samples for the current block based on the prediction samples for the current block, wherein the remaining mode information is decoded based on a truncated binary code.

3 Claims, 11 Drawing Sheets

METHOD FOR CODING INTRA-PREDICTION MODE, AND DEVICE FOR SAME

This application is a Continuation Application of U.S. patent application Ser. No. 17/979,642, filed Nov. 2, 2022, which is a Continuation of U.S. patent application Ser. No. 17/258,629, filed Jan. 7, 2021, which is a National Stage of International Application No. PCT/KR2019/007574, filed on Jun. 24, 2019 which claims the benefit of U.S. Provisional Application No. 62/696,830, filed on Jul. 11, 2018, the contents of which are all hereby incorporated by reference herein in their entirety.

BACKGROUND OF THE DISCLOSURE

Field of the Disclosure

The present disclosure relates to a still image or video encoding/decoding method, and more particularly, to a method and apparatus for coding an intra prediction mode.

Related Art

Demand for high-resolution, high-quality images such as HD (High Definition) images and UHD (Ultra High Definition) images has been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY

A technical objective of the present disclosure is to provide a method and apparatus which increase image coding efficiency.

Another technical objective of the present disclosure is to provide a method and apparatus which code an intra prediction mode.

Still another technical objective of the present disclosure is to provide a method and apparatus which code information on intra prediction mode candidates for a current block included in a Most Probable Modes (MPM) list, and on remaining intra prediction modes.

Still another technical objective of the present disclosure is to provide a method and apparatus which code remaining mode information indicating one of remaining intra prediction modes not included in the MPM list based on a truncated binary code.

According to an example of the present disclosure, there is provided a picture decoding method which is performed by a decoding apparatus. The method includes constructing a Most Probable Modes (MPM) list including intra prediction mode candidates for a current block based on neighboring blocks of the current block, decoding remaining mode information indicating one of remaining intra prediction modes other than the intra prediction mode candidates included in the MPM list from a bitstream, determining an intra prediction mode of the current block based on the decoded remaining mode information, generating prediction samples for the current block based on the determined intra prediction mode, and generating reconstructed samples for the current block based on the prediction samples for the current block, wherein the remaining mode information is decoded based on a truncated binary code.

According to another example of the present disclosure, there is provided a decoding apparatus performing picture decoding. The decoding apparatus includes an entropy decoder which decodes remaining mode information indicating one of remaining intra prediction modes other than intra prediction mode candidates for a current block included in a Most Probable Modes (MPM) list from a bitstream, a predictor which constructs the MPM list including the intra prediction mode candidates based on neighboring blocks of the current block, determines an intra prediction mode of the current block based on the decoded remaining mode information, and generates prediction samples for the current block based on the determined intra prediction mode, and an adder which generates reconstructed samples for the current block based on the prediction samples for the current block, wherein the remaining mode information is decoded based on a truncated binary code.

According to still another embodiment of the present disclosure, there is provided a picture encoding method which is performed by an encoding apparatus. The method includes constructing a Most Probable Modes (MPM) list including intra prediction mode candidates for a current block based on neighboring blocks of the current block; generating remaining mode information indicating, as an intra prediction mode of the current block, one of remaining intra prediction modes other than the intra prediction mode candidates included in the MPM list, generating prediction samples for the current block based on the intra prediction mode of the current block, deriving residual samples for the current block based on the prediction samples for the current block, and encoding image information including information on the residual samples and the remaining mode information, wherein the remaining mode information included in the image information is encoded based on a truncated binary code.

According to still another embodiment of the present disclosure, there is provided an encoding apparatus that performs picture encoding. The encoding apparatus includes a predictor which constructs an Most Probable Modes (MPM) list including intra prediction mode candidates for current block based on neighboring blocks of the current block, generate remaining mode information indicating, as the intra prediction mode of the current block, one of remaining intra prediction modes other than the intra prediction mode candidates included in the MPM list, and generate prediction samples for the current block based on the intra prediction mode of the current block, a residual processor which derives residual samples for the current block based on the prediction samples for the current block, and an entropy encoder which encodes image information including information on the residual samples and the remaining mode information, wherein the remaining mode information included in the image information is encoded based on a truncated binary code.

According to the present disclosure, it is possible to increase overall image/video compression efficiency.

According to the present disclosure, an intra prediction mode can be efficiently coded.

According to the present disclosure, information on intra prediction mode candidates for a current block included in an MPM list, and on remaining intra prediction modes can be efficiently coded.

According to the present disclosure, it is possible to efficiently code the remaining mode information indicating one of the remaining intra prediction modes not included in the MPM list based on a truncated binary code.

According to the present disclosure, when the number of intra prediction modes is large, overhead induced by signaling of information on the intra prediction mode can be effectively reduced. By reducing the overhead induced by signaling of information on the intra prediction mode, coding efficiency can be further increased in terms of BD-rate PSNR.

DESCRIPTION OF EXEMPLARY EMBODIMENTS

Figure 1:
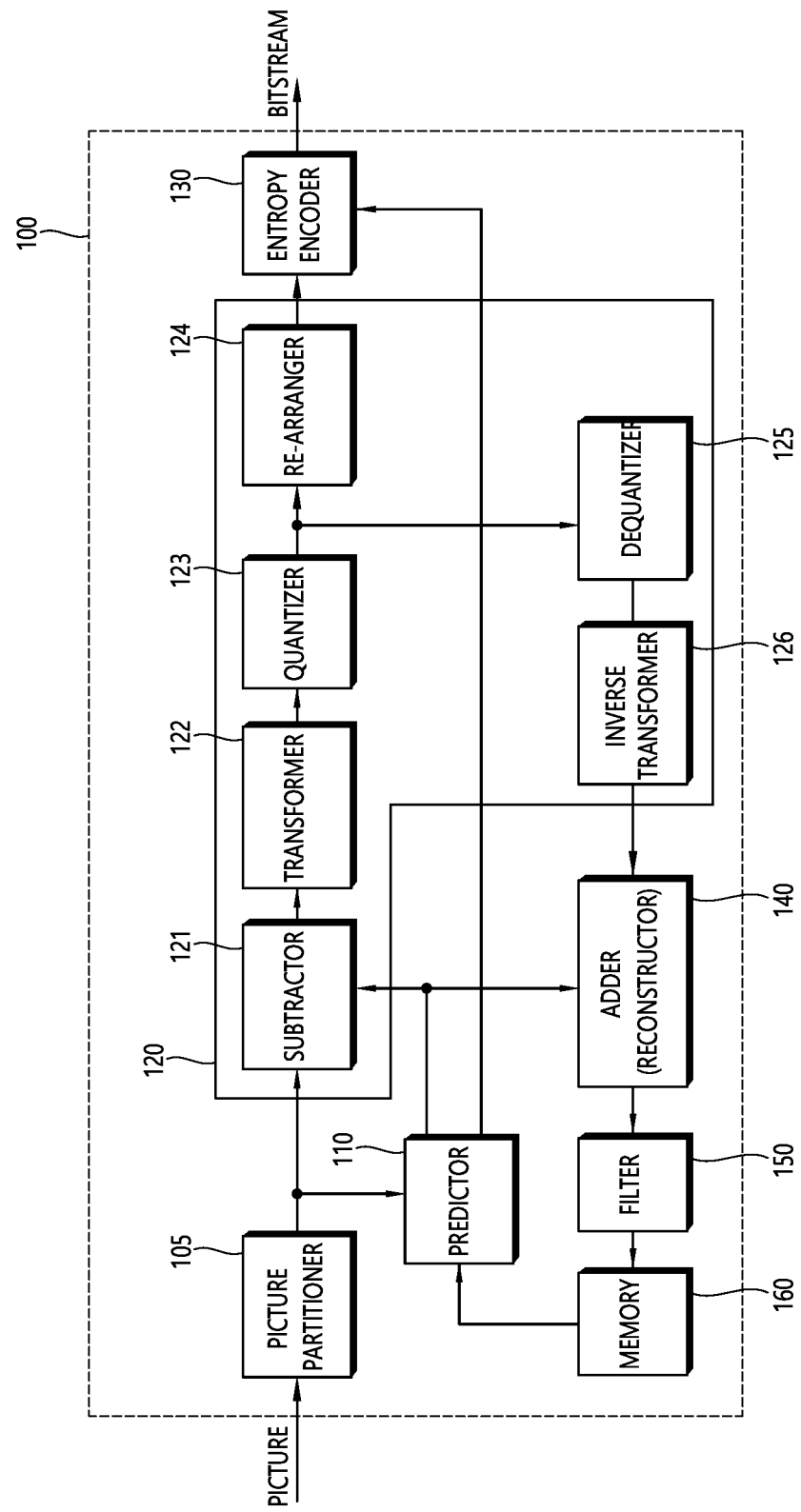
FIG. 1 is a diagram schematically illustrating a configuration of an encoding apparatus according to an example.

According to an example of the present disclosure, there is provided a picture decoding method performed by a decoding apparatus. The method includes constructing a Most Probable Modes (MPM) list including intra prediction mode candidates for a current block based on neighboring blocks of the current block, decoding remaining mode information indicating one of remaining intra prediction modes other than the intra prediction mode candidates included in the MPM list from a bitstream, determining an intra prediction mode of the current block based on the decoded remaining mode information, generating prediction samples for the current block based on the determined intra prediction mode, and generating reconstructed samples for the current block based on the prediction samples for the current block, wherein the remaining mode information is decoded based on a truncated binary code.

This disclosure can be modified in various forms, and specific embodiments thereof will be described and shown in the drawings. However, the embodiments are not intended for limiting this disclosure. The terms used in the following description are used to merely describe specific embodiments, but are not intended to limit this disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

Each of the components in the drawings described in this disclosure are shown independently for the convenience of description regarding different characteristic functions, and do not mean that the components are implemented in separate hardware or separate software. For example, two or more of each configuration may be combined to form one configuration, or one configuration may be divided into a plurality of configurations. Embodiments in which each configuration is integrated and/or separated are also included in the scope of this disclosure without departing from the spirit of this disclosure.

The following description relates to video/image coding. For example, the methods/embodiments disclosed in this document may be applied to a method disclosed in the versatile video coding (VVC), the EVC (essential video coding) standard, the AOMedia Video 1 (AV1) standard, the 2nd generation of audio video coding standard (AVS2), or the next generation video/image coding standard (ex. H.267 or H.268, etc.).

Hereinafter, exemplary embodiments of this disclosure will be described in detail with reference to the accompanying drawings. Hereinafter, the same reference numerals are used for the same components in the drawings, and redundant description of the same components is omitted.

In this document, video may refer to a series of images over time. Picture generally refers to a unit representing one image in a specific time zone, and a slice is a unit constituting part of a picture in coding. One picture may be configured with a plurality of slices, and if necessary, the picture and the slice may be mixed with each other.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma blocks. The unit may be used interchangeably with terms such as block or area in some cases. In a general case, an M×N block may include samples or a set of transform coefficients of M columns and N rows.

FIG. 1 is a diagram schematically illustrating a configuration of a video encoding apparatus to which this disclosure may be applied. Hereinafter, an encoding/decoding apparatus may include a video encoding/decoding apparatus and/or an image encoding/decoding apparatus, and the video encoding/decoding apparatus may be used as a concept including an image encoding/decoding apparatus or the image encoding/decoding apparatus may be used as a concept including a video encoding/decoding apparatus.

Referring to FIG. 1, an (video) encoding apparatus 100 may include a picture partitioning module 105, a prediction module 110, a residual processing module 120, an entropy encoding module 130, an adder 140, a filtering module 150, and a memory 160. The residual processing module 120 may include a subtractor 121, a transform module 122, a quantization module 123, a rearrangement module 124, a dequantization module 125, and an inverse transform module 126.

The picture partitioning module 105 may divide an input picture into at least one processing unit.

As an example, the processing unit may be referred to as a coding unit (CU). In this case, the coding unit may be recursively divided according to a quad-tree binary-tree (QTBT) structure from a largest coding unit (LCU). For example, one coding unit may be divided into a plurality of coding units of a deeper depth based on a quad tree structure, a binary tree structure, and/or a ternary tree structure. In this case, for example, the quad tree structure may be first applied, and the binary tree structure and the ternary tree structure may be applied later. Alternatively, the binary tree structure/tunary tree structure may be first applied. A coding procedure according to this disclosure may be performed based on a final coding unit that is no longer divided. In this case, a largest coding unit may be used immediately as a final coding unit based on coding efficiency according to an image characteristic or the coding unit may be recursively divided into coding units of deeper depths, as needed and thus a coding unit of an optimized size may be used as a final coding unit. Here, the coding procedure may include a procedure such as prediction, transform, and reconstruction to be described later.

As another example, the processing unit may include a coding unit (CU), a prediction unit (PU), or a transform unit (TU). The coding unit may be split from a largest coding unit (LCU) into coding units of deeper depths according to a quad tree structure. In this case, the largest coding unit may be immediately used as a final coding unit based on coding efficiency according to an image characteristic, or the coding unit may be recursively divided into coding units of lower depths, as needed and thus a coding unit of an optimized size may be used as a final coding unit. When a smallest coding unit (SCU) is set, the coding unit cannot be split into smaller coding units than the SCU. Here, the final coding unit means a coding unit to be the basis of being partitioned or split into a prediction unit or a transform unit. The prediction unit is a unit to be partitioned from the coding unit and may be a unit of sample prediction. In this case, the prediction unit may be divided into sub blocks. The transform unit may be divided according to a quad tree structure from the coding unit and may be a unit for deriving a transform coefficient and/or a unit for deriving a residual signal from the transform coefficient. Hereinafter, a coding unit may be referred to as a coding block (CB), a prediction unit may be referred to as a prediction block (PB), and a transform unit may be referred to as a transform block (TB). The prediction block or the prediction unit may mean a specific area of a block form within a picture and include an array of prediction samples. Further, the transform block or the transform unit may mean a specific area of a block form within a picture and include an array of transform coefficients or residual samples.

The prediction module 110 may perform prediction on a block to be processed (hereinafter, may mean a current block or a residual block) and generate a predicted block including prediction samples for the current block. A unit of prediction performed by the prediction module 110 may be a coding block, a transform block, or a prediction block.

The prediction module 110 may determine whether intra prediction or inter prediction is applied to the current block.

As an example, the prediction module 110 may determine whether intra prediction or inter prediction is applied in a CU unit.

In the case of intra prediction, the prediction module 110 may derive a prediction sample for a current block based on a reference sample outside the current block in a picture (hereinafter, a current picture) to which the current block belongs. In this case, the prediction module 110 may (i) derive a prediction sample based on average or interpolation of neighboring reference samples of the current block and (ii) derive the prediction sample based on a reference sample present in a specific (prediction) direction for a prediction sample of neighboring reference samples of the current block. A case of (i) may be referred to as a non-directional mode or a non-angle mode, and a case of (ii) may be referred to as a directional mode or an angular mode. In intra prediction, the prediction mode may have, for example, 33 directional prediction modes and at least two non-directional modes. The non-directional mode may include a DC prediction mode and a planner mode. The prediction module 110 may determine a prediction mode applied to the current block using the prediction mode applied to the neighboring block.

In the case of inter prediction, the prediction module 110 may derive a prediction sample for a current block based on a sample specified by a motion vector on a reference picture. The prediction module 110 may apply any one of a skip mode, a merge mode, and a motion vector prediction (MVP) mode to derive a prediction sample for the current block. In the case of the skip mode and the merge mode, the prediction module 110 may use motion information of the neighboring block as motion information of the current block. In the case of the skip mode, unlike the merge mode, the difference (residual) between the prediction sample and the original sample is not transmitted. In the case of the MVP mode, by using a motion vector predictor of the current block using a motion vector of the neighboring block as a motion vector predictor, a motion vector of the current block may be derived.

In the case of inter prediction, the neighboring block may include a spatial neighboring block existing in the current picture and a temporal neighboring block present in the reference picture. A reference picture including the temporal neighboring block may be referred to as a collocated picture (colPic). The motion information may include a motion vector and a reference picture index. Information such as prediction mode information and motion information may be (entropy) encoded and output in the form of a bitstream.

When motion information of the temporal neighboring block is used in the skip mode and the merge mode, the highest picture on a reference picture list may be used as the reference picture. Reference pictures included in the reference picture list may be arranged based on a difference in a picture order count (POC) between a current picture and a corresponding reference picture. The POC corresponds to display order of pictures and may be distinguished from the coding order.

The subtractor 121 generates a residual sample, which is a difference between the original sample and the prediction sample. When the skip mode is applied, residual samples may not be generated, as described above.

The transform module 122 transforms the residual sample in transform block units to generate transform coefficients. The transform module 122 may perform transform according to a size of the transform block and a prediction mode applied to the coding block or the prediction block that spatially overlaps with the transform block. For example, when intra prediction is applied to the coding block or the prediction block that overlaps with the transform block, and the transform block is a 4×4 residual array, the residual sample is transformed using a discrete sine transform (DST) kernel, and in other cases, the residual sample may be transformed using a discrete cosine transform (DCT) kernel.

The quantization module 123 may quantize transform coefficients to generate quantized transform coefficients.

The rearrangement module 124 rearranges the quantized transform coefficients. The rearrangement module 124 may rearrange quantized transform coefficients of a block form into a one-dimensional vector form through a coefficient scanning method. Here, the rearrangement module 124 has been described in a separate configuration, but the rearrangement module 124 may be part of the quantization module 123.

The entropy encoding module 130 may perform entropy encoding for the quantized transform coefficients. Entropy encoding may include, for example, encoding methods such as exponential Golomb, context-adaptive variable length coding (CAVLC), context-adaptive binary arithmetic coding (CABAC), and the like. The entropy encoding module 130 may encode according to entropy encoding or a predetermined method together with or separately from information (e.g., a value of a syntax element) necessary for video reconstruction other than the quantized transform coefficients. The encoded information may be transmitted or stored in units of network abstraction layer (NAL) units in the form of a bitstream. The bitstream may be transmitted through a network or may be stored in a digital storage medium. Here, the network may include a broadcasting network and/or a communication network, and the digital storage medium may include various storage media such as a universal serial bus (USB), secure digital (SD), compact disc (CD), digital video disc (DVD), Blu-ray, hard disk drive (HDD), solid state drive (SSD) and the like.

The dequantization module 125 inverse quantizes quantized values (quantized transform coefficients) in the quantization module 123, and the inverse transform module 126 inverse transforms inverse quantized values in the dequantization module 125 to generate a residual sample.

The adder 140 reconstructs the picture by combining the residual sample and the predictive sample. The residual sample and the prediction sample may be added in units of blocks to generate a reconstructed block. Here, the adder 140 has been described in a separate configuration, but the adder 140 may be part of the prediction module 110. The adder 140 may also be referred to as a reconstruction module or a reconstruction block generator.

The filtering module 150 may apply a deblocking filter and/or a sample adaptive offset to the reconstructed picture. Through deblocking filtering and/or sample adaptive offset, artifacts at a block boundary within the reconstructed picture or distortion in a quantization process may be corrected. The sample adaptive offset may be applied in a sample unit and may be applied after a process of deblocking filtering is completed. The filtering module 150 may apply an adaptive loop filter (ALF) to the reconstructed picture. The ALF may be applied to the reconstructed picture after the deblocking filter and/or sample adaptive offset is applied.

The memory 160 may store reconstructed pictures (decoded pictures) or information necessary for encoding/decoding. Here, the reconstructed picture may be a reconstructed picture in which the filtering process is completed by the filtering module 150. The stored reconstructed picture may be used as a reference picture for (inter) prediction of another picture. For example, the memory 160 may store (reference) pictures used for inter prediction. In this case, pictures used for inter prediction may be designated by a reference picture set or a reference picture list.

Figure 2:
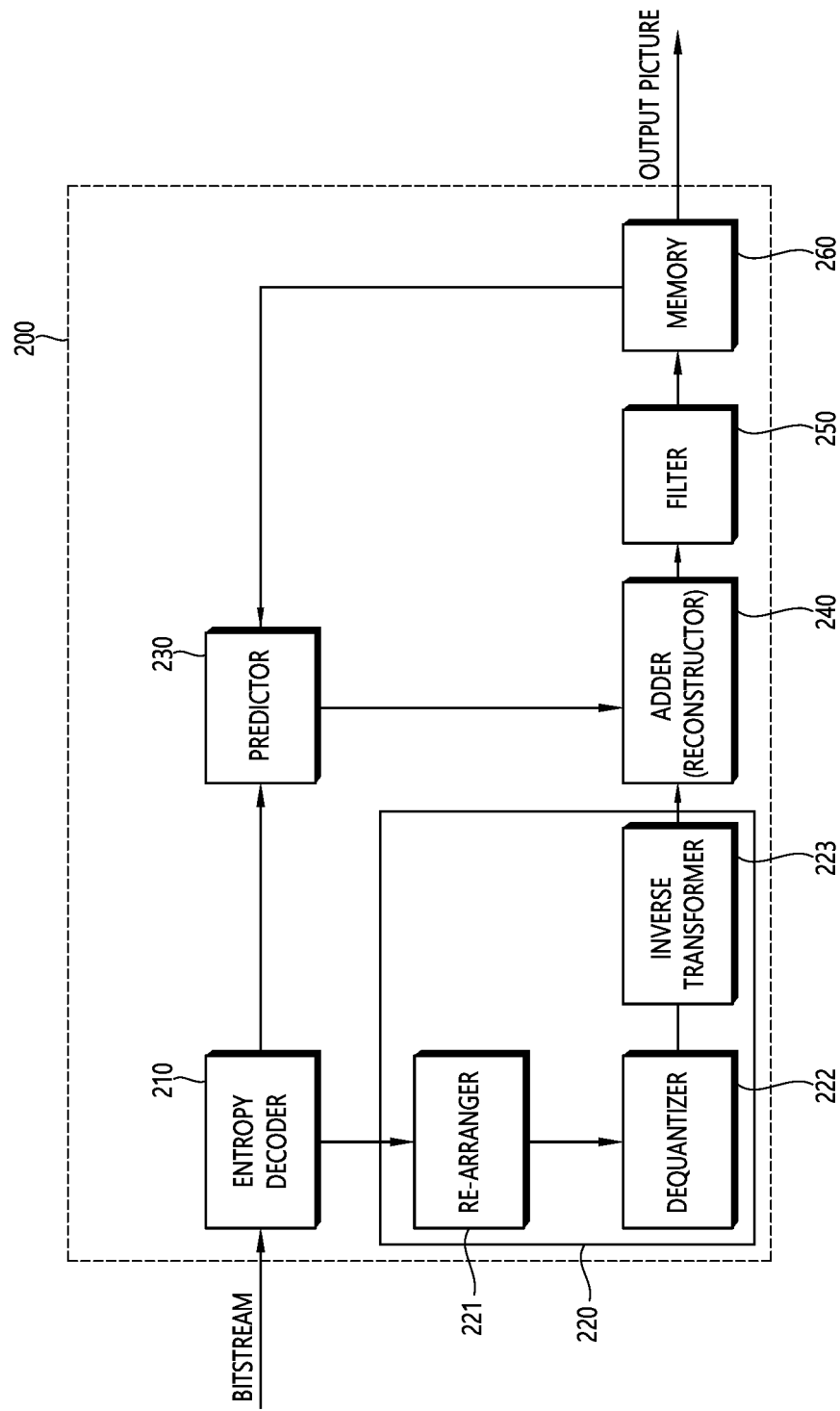
FIG. 2 is a diagram schematically illustrating a configuration of a decoding apparatus according to an example.

FIG. 2 is a diagram schematically illustrating a configuration of a video/image decoding apparatus to which this disclosure may be applied. Hereinafter, the video decoding apparatus may include an image decoding apparatus.

Referring to FIG. 2, the video decoding apparatus 200 may include an entropy decoding module 210, a residual processing module 220, a prediction module 230, an adder 240, a filtering module 250, and a memory 260. Here, the residual processing module 220 may include a rearrangement module 221, a dequantization module 222, and an inverse transform module 223. Further, although not shown, the video decoding apparatus 200 may include a receiver that receives bitstream including video information. The receiver may be configured as a separate module or may be included in the entropy decoding module 210.

When bitstream including video/image information is input, the video decoding apparatus 200 may reconstruct a video/image/picture to correspond to a process in which video/image information is processed in the video encoding apparatus.

For example, the video decoding apparatus 200 may perform video decoding using a processing unit applied in the video encoding apparatus. Thus, a processing unit block of video decoding may be, for example, a coding unit, and in another example, the processing unit block of video decoding may be a coding unit, a prediction unit, or a transform unit. The coding unit may be split according to a quad tree structure, a binary tree structure, and/or a ternary tree structure from the largest coding unit.

The prediction unit and the transform unit may be further used in some cases, and in this case, the prediction block is a block derived or partitioned from the coding unit and may be a unit of sample prediction. In this case, the prediction unit may be split into subblocks. The transform unit may be split according to the quad tree structure from the coding unit, and may be a unit for deriving a transform coefficient or a unit for deriving a residual signal from a transform coefficient.

The entropy decoding module 210 may parse bitstream and output information necessary for video reconstruction or picture reconstruction. For example, the entropy decoding module 210 may decode information in the bitstream based on a coding method such as exponential Golomb coding, CAVLC, or CABAC and output values of syntax elements required for video reconstruction and quantized values of transform coefficients for residuals.

More specifically, the CABAC entropy decoding method may include receiving a bin corresponding to each syntax element in a bitstream, determining a context model using to-be-decoded syntax element information, decoding information of a neighboring block and a to-be-decoded block, or information of a symbol/bin decoded in a previous step, and predicting a probability of occurrence of a bin according to the determined context model and thus performing arithmetic decoding of the bin to generate a symbol corresponding to a value of each syntax element. In this connection, after determining the context model, the CABAC entropy decoding method may further include a step of updating the context model using the information of the decoded symbol/bin to determine a context model of the next symbol/bin.

Information related to prediction among information decoded by the entropy decoding module 210 may be provided to the prediction module 230, and a residual value in which entropy decoding is performed by the entropy decoding module 210, i.e., the quantized transform coefficient may be input to the rearrangement module 221.

The rearrangement module 221 may rearrange the quantized transform coefficients in a two-dimensional block form. The rearrangement module 221 may perform rearrangement to correspond to coefficient scanning performed by the encoding apparatus. Here, the rearrangement module 221 has been described in a separate configuration, but the rearrangement module 221 may be part of the dequantization module 222.

The dequantization module 222 may dequantize the quantized transform coefficients based on the (inverse) quantization parameter to output the transform coefficients. In this case, information for deriving a quantization parameter may be signaled from the encoding apparatus.

The inverse transform unit 223 may inversely transform transform coefficients to derive residual samples.

The prediction module 230 may perform prediction of a current block and generate a predicted block including prediction samples for the current block. A unit of prediction performed by the prediction module 230 may be a coding block, a transform block, or a prediction block.

The prediction module 230 may determine whether to apply intra prediction or inter prediction based on information about the prediction. In this case, a unit for determining one of intra prediction and inter prediction to apply and a unit for generating a prediction sample may be different. Further, a unit for generating a prediction sample in inter prediction and intra prediction may also be different. For example, whether to apply inter prediction or intra prediction may be determined in units of a CU. Further, for example, in inter prediction, a prediction mode may be determined and a prediction sample may be generated in PU units, and in intra prediction, a prediction mode may be determined in PU units and a prediction sample may be generated in TU units.

In the case of intra prediction, the prediction module 230 may derive a prediction sample for a current block based on the neighbor reference samples in a current picture. By applying a directional mode or a non-directional mode based on the neighbor reference samples of the current block, the prediction module 230 may derive the prediction sample for the current block. In this case, the prediction mode to be applied to the current block may be determined using the intra prediction mode of the neighboring block.

In the case of inter prediction, the prediction module 230 may derive the prediction sample for the current block based on the sample specified on the reference picture by a motion vector on the reference picture. The prediction module 230 may apply one of a skip mode, a merge mode, and an MVP mode to derive a prediction sample for the current block. In this case, motion information required for inter prediction of the current block provided by the video encoding apparatus, for example, information about a motion vector, a reference picture index, and the like may be obtained or derived based on information about the prediction.

In case of the skip mode and the merge mode, motion information of the neighboring block may be used as motion information of the current block. In this case, the neighboring block may include a spatial neighboring block and a temporal neighboring block.

The prediction module 230 may construct a merge candidate list with motion information of available neighboring blocks and use information indicated by a merge index on the merge candidate list as a motion vector of the current block. The merge index may be signaled from the encoding apparatus. The motion information may include a motion vector and a reference picture. When motion information of the temporal neighboring block is used in the skip mode and the merge mode, a highest picture on the reference picture list may be used as a reference picture.

In case of the skip mode, unlike the merge mode, the difference (residual) between the prediction sample and the original sample is not transmitted.

In case of the MVP mode, the motion vector of the current block may be derived using the motion vector of the neighboring block as a motion vector predictor. In this case, the neighboring block may include a spatial neighboring block and a temporal neighboring block.

For example, when the merge mode is applied, a merge candidate list may be generated using a motion vector of a reconstructed spatial neighboring block and/or a motion vector corresponding to a Col block, which is a temporal neighboring block. In the merge mode, the motion vector of the candidate block selected from the merge candidate list is used as the motion vector of the current block. Information about the prediction may include a merge index indicating a candidate block having an optimal motion vector selected from candidate blocks included in the merge candidate list. In this case, the prediction module 230 may derive a motion vector of the current block using the merge index.

As another example, when the Motion Vector Prediction (MVP) mode is applied, a motion vector predictor candidate list may be generated using a motion vector corresponding to a motion vector of a reconstructed spatial neighboring block and/or a motion vector corresponding to a Col block, which is a temporal neighboring block. That is, a motion vector of the reconstructed spatial neighboring block and/or a motion vector corresponding to the Col vector, which is a temporal neighboring block, may be used as a motion vector candidate. The information about the prediction may include a prediction motion vector index indicating an optimal motion vector selected from the motion vector candidates included in the list. In this case, the prediction module 230 may select a predicted motion vector of the current block from the motion vector candidates included in the motion vector candidate list using the motion vector index. The prediction unit of the encoding apparatus may obtain a motion vector difference (MVD) between the motion vector of the current block and the motion vector predictor and encode the MVD to output the MVD in a bitstream form. That is, the MVD may be obtained by subtracting the motion vector predictor from the motion vector of the current block. In this case, the prediction module 230 may obtain a motion vector difference included in information about the prediction, and derive the motion vector of the current block by adding the motion vector difference and the motion vector predictor. The prediction unit may also obtain or derive a reference picture index or the like indicating a reference picture from the information about the prediction.

The adder 240 may add the residual sample and the predictive sample to reconstruct the current block or the current picture. The adder 240 may add the residual sample and the predictive sample in block units to reconstruct the current picture. When the skip mode is applied, the residual is not transmitted and thus the prediction sample may be a reconstruction sample. Here, the adder 240 has been described in a separate configuration, but the adder 240 may be part of the prediction module 230. The adder 240 may also be referred to as a reconstruction module or a reconstruction block generator.

The filtering module 250 may apply deblocking filtering sample adaptive offset and/or an ALF to the reconstructed picture. In this case, the sample adaptive offset may be applied in units of samples and be applied after deblocking filtering. The ALF may be applied after deblocking filtering and/or sample adaptive offset.

The memory 260 may store reconstructed pictures (decoded pictures) or information necessary for decoding. Here, the reconstructed picture may be a reconstructed picture in which a filtering procedure is completed by the filtering module 250. For example, the memory 260 may store pictures used for inter prediction. In this case, pictures used for inter prediction may be designated by a reference picture set or a reference picture list. The reconstructed picture may be used as a reference picture for another picture. Further, the memory 260 may output the reconstructed picture in output order.

As described above, in performing video coding, prediction is performed to increase compression efficiency. Thereby, a predicted block including prediction samples of the current block, which is a coding target block, may be generated. Here, the predicted block includes prediction samples in a spatial domain (or pixel domain). The predicted block is equally derived in the encoding apparatus and the decoding apparatus, and the encoding apparatus may signal information (residual information) about residual between the original block and the predicted block instead of an original sample value itself of the original block to the decoding apparatus to increase image coding efficiency. The decoding apparatus may derive a residual block including residual samples based on the residual information, generate a reconstructed block including reconstructed samples by adding the residual block and the predicted block, and generate a reconstructed picture including reconstructed blocks.

The residual information may be generated through transform and quantization procedures. For example, the encoding apparatus may derive a residual block between the original block and the predicted block, perform a transform procedure of residual samples (residual sample array) included in the residual block to derive transform coefficients, perform a quantization procedure of the transform coefficients to derive the quantized transform coefficients, and signal related residual information to the decoding apparatus (through bitstream). Here, the residual information may include information such as value information of the quantized transform coefficients, position information, a transform scheme, a transform kernel, and a quantization parameter. The decoding apparatus may perform an inverse quantization/inverse transformation procedure and derive residual samples (or residual blocks) based on the residual information. The decoding apparatus may generate a reconstructed picture based on the predicted block and the residual block. The encoding apparatus may inverse quantize/inverse transform quantized transform coefficients for reference for inter prediction of a subsequent picture to derive the residual block, and generate a reconstructed picture based on the residual block.

Figure 3:
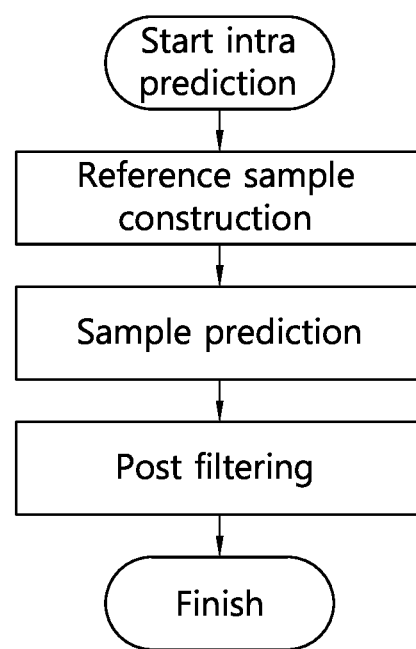
FIG. 3 is a flowchart illustrating an intra prediction method according to an example.

FIG. 3 is a flowchart illustrating an intra prediction method according to an example.

As illustrated in FIG. 3, the intra prediction method according to an example may include three steps of constructing a reference sample, predicting a sample, and performing post filtering. In the step of predicting a sample, neighboring blocks (or neighboring reference samples) and an intra prediction mode may be used to predict unknown samples.

When the total number of intra prediction modes including intra directional modes and intra non-directional modes is 67, based on of No. 34 intra prediction mode having a left upward diagonal prediction direction, they may be divided into an intra prediction mode having horizontal directionality and a intra prediction mode having vertical directionality. For example, the Nos. 2 to 34 intra prediction modes may have horizontal directionality, and the Nos. 35 to 66 intra prediction modes may have vertical directionality. The No. 18 intra prediction mode and the No. 50 intra prediction mode may represent a horizontal intra prediction mode and a vertical intra prediction mode, respectively, the No. 2 intra prediction mode may be called a left downward diagonal intra prediction mode, the No. 34 intra prediction mode may be called a left upward diagonal intra prediction mode, and the No. 66 intra prediction mode may be called a right upward diagonal intra prediction mode. Meanwhile, in FIG. 3, a case in which the total number of intra prediction modes is 67 is described, but the example is not limited to this. For example, the total number of intra prediction modes may be 35.

In the following description of FIG. 4, an MPM intra prediction method for deriving an intra prediction mode of a current block based on intra prediction modes of neighboring blocks will be specifically discussed.

Figure 4:
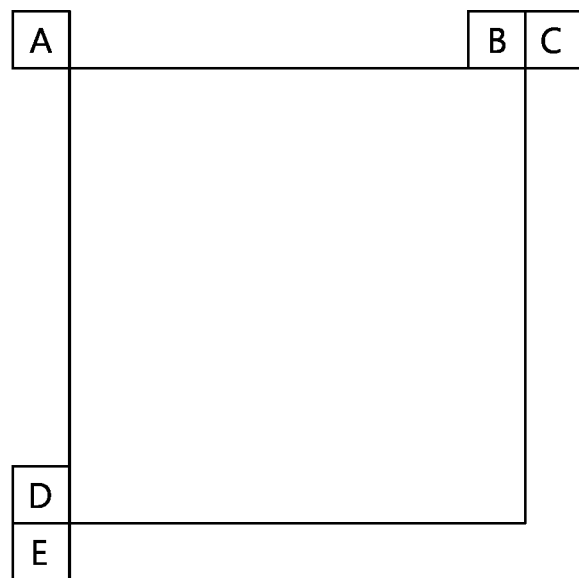
FIG. 4 is a diagram illustrating an example of locations of neighboring blocks for constructing an MPM list.

FIG. 4 is a diagram illustrating an example of locations of neighboring blocks for constructing an MPM list.

In an encoding apparatus according to an example, an intra prediction mode applied to the current block may be determined by jointly optimizing a bit rate and distortion.

When intra prediction is applied to the current block, an intra prediction mode applied to the current block (also referred to as best intra prediction mode) may be derived based on the intra prediction mode of the neighboring block(s) of the current block. For example, the decoding apparatus may derive a most probable mode (MPM) list based on intra prediction mode candidates (Intra prediction mode candidates of the current block may be referred to as an MPM or MPM candidates) including an intra prediction mode and additional candidate modes of a neighboring block of the current block (e.g., a left neighboring block and/or a top neighboring block), and may select one of intra prediction mode candidates in the derived MPM list based on the received MPM index. The MPM index may be referred to as, for example, intra_luma_mpm_idx.

If the best intra prediction mode is not included in the MPM list, the best intra prediction mode may be derived by selecting one of the remaining intra prediction modes not included in the MPM list based on the remaining mode information. The remaining mode information may be referred to as, for example, intra_luma_mpm_remainder.

The MPM list may be referred to as an intra prediction mode candidate list or may be represented as candModeList.

When the total number of intra prediction modes is 67, the MPM list may include, for example, 3 MPM candidates, 5 MPM candidates, or 6 MPM candidates. Also, even when the total number of intra prediction modes is 35, the MPM list may include, for example, 3 MPM candidates, 5 MPM candidates, or 6 MPM candidates, but the example is not limited to this.

As one example, the MPM list may include candidates derived based on an intra prediction mode of a neighboring block, a derived intra prediction mode, and/or a default intra prediction mode. The encoding apparatus/decoding apparatus may search neighboring blocks of the current block according to a specific order, and may derive the intra prediction modes of the neighboring block as the MPM candidate according to the order in which the intra prediction modes are derived. For example, the neighboring blocks may include a left neighboring block (block D in FIG. 4), a top neighboring block (block B), a bottom-left corner neighboring block (block E), a top-right neighboring block (block C), and a top-left corner neighboring block (block A), and the encoding apparatus/decoding apparatus may search an intra prediction mode of the left neighboring block (block D), an intra prediction mode of the top neighboring block (block B), a planar intra prediction mode, a DC intra prediction mode, an intra prediction mode of the bottom-left corner neighboring block (block E), an intra prediction mode of the top-right neighboring block (block C), and an intra prediction mode of the top-left corner neighboring block (block A) in this order, may derive an MPM candidate, and may construct the MPM list of the current block. Meanwhile, if six MPM candidates are not derived after the search, an MPM candidate may be derived based on an intra prediction mode derived as an MPM candidate. For example, when the intra prediction mode derived as the MPM candidate is the No. N intra prediction mode, the encoding apparatus/decoding apparatus may derive the No. N+1 intra prediction mode and/or the No. N−1 intra prediction mode as the MPM candidate of the current block.

Meanwhile, in an example, in order to efficiently code the intra prediction mode, truncated binary coding may be used instead of fixed length coding. If there are symbols for a total of u intra prediction modes, and a truncated binary code of k bits is used to code the first L symbols, and a truncated binary code of k+1 bits is used to code the remaining u−L symbols, then Equation 1 below may be applied between u and k, and Equation 2 below may be applied between L, k and u.

$$k = \text{floor}(\log_2 u) \quad \text{[Equation 1]}$$

$$L = 2^{k+1} - u \quad \text{[Equation 2]}$$

Table 1 below shows examples of L, k, and u, and Table 2 shows examples of binarization of a truncated binary code when u=61, k=5, and L=3.

TABLE 1

| Total number of symbols u | k bit to code first L symbols | First L symbols |
| --- | --- | --- |
| 28 | 4 | 3 |
| 61 | 5 | 3 |
| 62 | 5 | 2 |

TABLE 2

| Input symbols | Mapped value | binary | Number of bits use to code |
| --- | --- | --- | --- |
| 0 | 0 | 00000 | 5 |
| 1 | 1 | 00001 | 5 |
| 2 | 2 | 00010 | 5 |
| 3 | 6 | 000110 | 6 |
| 4 | 7 | 000111 | 6 |
| 5 | 8 | 001000 | 6 |
| ... | ... | ... | ... |
| 60 | 63 | 111111 | 6 |

Referring to Table 2, each input symbol may represent intra prediction modes, and the input symbol with a lower number may represent the intra prediction mode having a lower number. It can be confirmed that a 5-bit truncated binary code is used to code the first 3 symbols, and a 6-bit truncated binary code is used to code the symbols subsequent to the first 3 symbols. In one embodiment, in a case where the total number of intra prediction modes is 67 and the number of MPM candidates is 6, the relationship according to Table 2 may be applied when coding 61 MPM remaining intra prediction modes based on the truncated binary coding.

In one example, the list including all the intra prediction modes may be referred to as an intra mode list. Examples of the intra mode list may be various. For example, the intra mode list may be derived as {0, 1, 2, . . . , 64, 65, 66} based on an ascending order of the intra prediction mode numbers. Alternatively, the intra mode list may be derived as, for example, {66, 50, 34, . . . , 2, 18} based on a predefined order.

Figure 5:
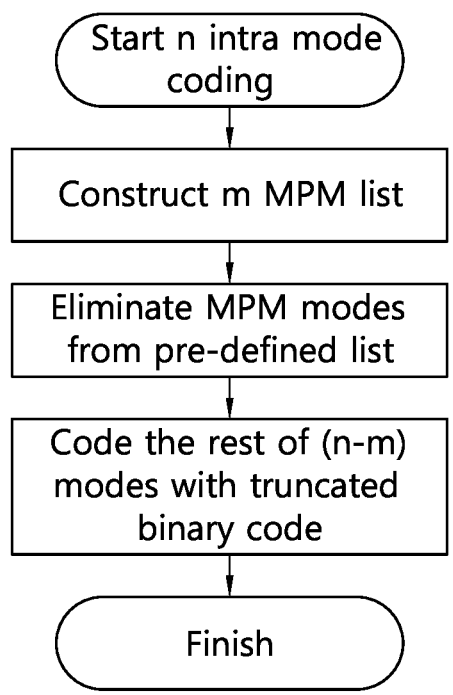
FIG. 5 is an example of a flowchart illustrating a method of coding remaining mode information indicating one of the remaining intra prediction modes not included in an MPM list based on a truncated binary code.

FIG. 5 is an example of a flowchart illustrating a method of coding remaining mode information indicating one of the remaining intra prediction modes not included in an MPM list based on a truncated binary code.

The encoding apparatus and/or the decoding apparatus according to an example may code a total of n intra prediction modes based on the following three steps. In the first step, an MPM list including m MPMs may be constructed. In the second step, m MPMs may be removed from a predefined mode list including all the n intra prediction modes, which may be referred to as INTRA_MODE_MAP. In the third step, (n−m) intra prediction modes resulting from removing m MPMs from all the n intra prediction modes may be coded based on the truncated binary coding. In this case, the truncated binary coding may be based on the examples according to Equations 1, 2, Tables 1, 2, and related descriptions.

In an example, the INTRA_MODE_MAP may represent a list in which all the n intra prediction modes are sorted according to a predefined order. Since the first L symbols based on the truncated binary coding use fewer bits than the remaining symbols, INTRA_MODE_MAP according to an example may arrange intra prediction modes with a high probability of being selected as the best intra prediction mode based on Rate-Distortion Optimization (RDO) at the beginning of the list (i.e., assigning a high priority or a low index). For example, INTRA_MODE_MAP may be defined as {0, 1, 50, 18, 49, 10, 12, 19, 11, 34, 2, 17, 54, 33, 46, 51, 35, 15, 13, 45, 22, 14, 66, 21, 47, 48, 23, 53, 58, 16, 42, 20, 24, 44, 26, 43, 55, 52, 37, 29, 39, 41, 25, 9, 38, 56, 30, 36, 32, 28, 62, 27, 40, 8, 3, 7, 57, 6, 31, 4, 65, 64, 5, 59, 60, 61, 63}.

In an embodiment, when m=6 MPMs are used for a total of 67 intra prediction modes, the remaining 61 intra prediction modes may be coded using the truncated binary code. When an MPM list including 6 MPMs is constructed, 6 MPMs may be removed from INTRA_MODE_MAP. To save the bit number, the first L=3 intra prediction modes of the INTRA_MODE_MAP from which 6 MPMs have been removed may be coded as 00000, 00001 and 00010, respectively, based on 5 bits. In addition, the remaining (n−m)−L=58 intra prediction modes may be coded as 000100, 000101, . . . etc. based on 6 bits. Meanwhile, the truncated binary code, such as 00000, 00001, 000100 or the like, described in this example is only an example, and it will be easily understood by those skilled in the art that the truncated binary code is not limited to the aforementioned example.

Figure 6:
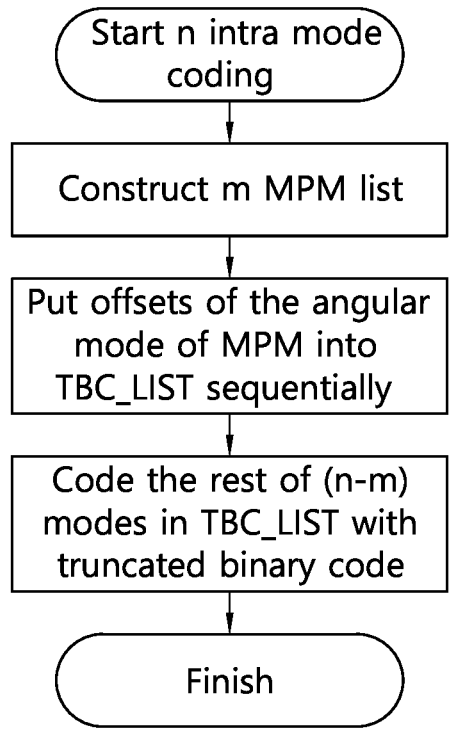
FIG. 6 is another example of a flowchart illustrating a method of coding remaining mode information indicating one of the remaining intra prediction modes not included in an MPM list based on a truncated binary code.

FIG. 6 is another example of a flowchart illustrating a method of coding remaining mode information indicating one of the remaining intra prediction modes not included in an MPM list based on a truncated binary code.

The encoding apparatus and/or the decoding apparatus according to an example may code a total of n intra prediction modes based on the following three steps.

In the first step, an MPM list including m MPMs may be constructed.

In the second step, an offset may be applied to an intra directional mode among MPMs, and an intra prediction mode derived by applying the offset may be arranged in one list in order. The list may be referred to as, for example, TBC_LIST. In one example, the offset may be applied in the order of −1, +1, −2, +2, . . . , −4, +4.

In the third step, (n−m) intra prediction modes resulting from removing m MPMs from all the n intra prediction modes may be coded based on the truncated binary coding. That is, the truncated binary coding may be applied to TBC_LIST including (n−m) intra prediction modes resulting from removing m MPMs from all the n intra prediction modes.

According to the first to third steps, (n−m) intra prediction modes may be sorted in TBC_LIST based on intra prediction mode numbers and offset values of m MPMs. The offset values include a first offset value, a second offset value, a third offset value, and a fourth offset value, and when the m is 6 and the n is 67, and the intra prediction mode numbers of the MPM are a, b, c, d, e, and f in order, an intra prediction mode whose intra prediction mode number is a− the first offset value, an intra prediction mode whose intra prediction mode number is a+ the first offset value, an intra prediction mode whose intra prediction mode number is b− the first offset value, an intra prediction mode whose intra prediction mode number is b+ the first offset value, an intra prediction mode whose intra prediction mode number is c− the first offset value, an intra prediction mode whose intra prediction mode number is c+ the first offset value, an intra prediction mode whose intra prediction mode number is d− the first offset value, an intra prediction mode whose intra prediction mode number is d+ the first offset value, an intra prediction mode whose intra prediction mode number is e− the first offset value, an intra prediction mode whose intra prediction mode number is e+ the first offset value, an intra prediction mode whose intra prediction mode number is f− the first offset value, an intra prediction mode whose intra prediction mode number is f+ the first offset value, an intra prediction mode whose intra prediction mode number is a− the second offset value, an intra prediction mode whose intra prediction mode number is a+ the second offset value, . . . , an intra prediction mode whose intra prediction mode number is f− the fourth offset value, and an intra prediction mode whose intra prediction mode number is f+ the fourth offset value may be sorted in this order in the TCB_LIST.

In this case, when an invalid intra prediction mode number exists among the intra prediction mode numbers to which the offset values are summed, the intra prediction mode according to the invalid intra prediction mode number may be excepted from the list, and the offset values may not be applied to an intra non-directional mode among the intra prediction mode candidates. The invalid intra prediction mode number may be, for example, an integer other than 0 to 66. The intra non-directional mode may include a planar mode, a DC mode, and the like.

When m=6 MPMs are used for a total of 67 intra prediction modes, the remaining 61 intra prediction modes may be coded as follows using the truncated binary code. For example, if the MPM list is derived as {50, 8, 0, 1, 66, 54}, TBC_LIST may be determined as {49, 51, 7, 9, 65, 53, 55, 48, 52, 6, 10, 64, 56, . . . }. Offsets −1 and +1 are applied in this order to the intra prediction mode number of the first intra prediction mode candidate among 6 MPMs, offsets −2 and +2 are applied in this order to the intra prediction mode number of the second intra prediction mode candidate, and similarly offsets −1 and +1 are applied in this order to the intra prediction mode number of the sixth intra prediction mode candidate, then going back to the first intra prediction mode candidate, offsets −2 and +2 are applied in order, and it can be confirmed that TBC_LIST is constructed by the same principle. Among the MPM list, the intra prediction mode number 0 represents the planner mode, and the intra prediction mode number 1 represents the DC mode. Therefore, it can be confirmed that offset application and list addition are not done for 0 and 1.

To save the bit number, the first L=3 intra prediction modes of the TBC_LIST may be coded as 00000, 00001 and 00010, respectively, based on 5 bits. In addition, the remaining (n−m)−L=58 intra prediction modes may be coded as 000100, 000101, . . . etc. based on 6 bits. Meanwhile, the truncated binary code, such as 00000, 00001, 000100 or the like, described in this example is only an example, and it will be easily understood by those skilled in the art that the truncated binary code is not limited to the aforementioned example. In the above example where the TBC_LIST is {49, 51, 7, 9, 65, 53, 55, 48, 52, 6, 10, 64, 56, . . . }, for the prediction modes whose intra prediction mode number is 49, 51 or 7, the truncated binary coding may be applied based on 5 bits, while, for the remaining intra prediction modes, the truncated binary coding may be applied based on 6 bits.

Meanwhile, in the present specification, a specific term or sentence is used for defining a specific information or concept. In one example of the present specification, a list in which a total of n intra prediction modes are sorted in a predefined order is defined as "INTRA_MODE_MAP", and a list which is constructed by applying an offset to and then sorting in order an intra directional mode among MPMs is defined as "TBC_LIST". However, "INTRA_MODE_MAP" may be replaced by various terms, such as IntraModeMap or intra prediction mode sorted list, and "TBC_LIST" may be replaced by various terms, such as TBC list or MPM offset list. Therefore, when interpreting specific terms or sentences used to define specific information or concepts herein throughout the description, interpretations limited to the names should not be made, and the term needs to be interpreted under the consideration of various operations, functions, and effects according to the contents which the term intends to express.

Figure 7:
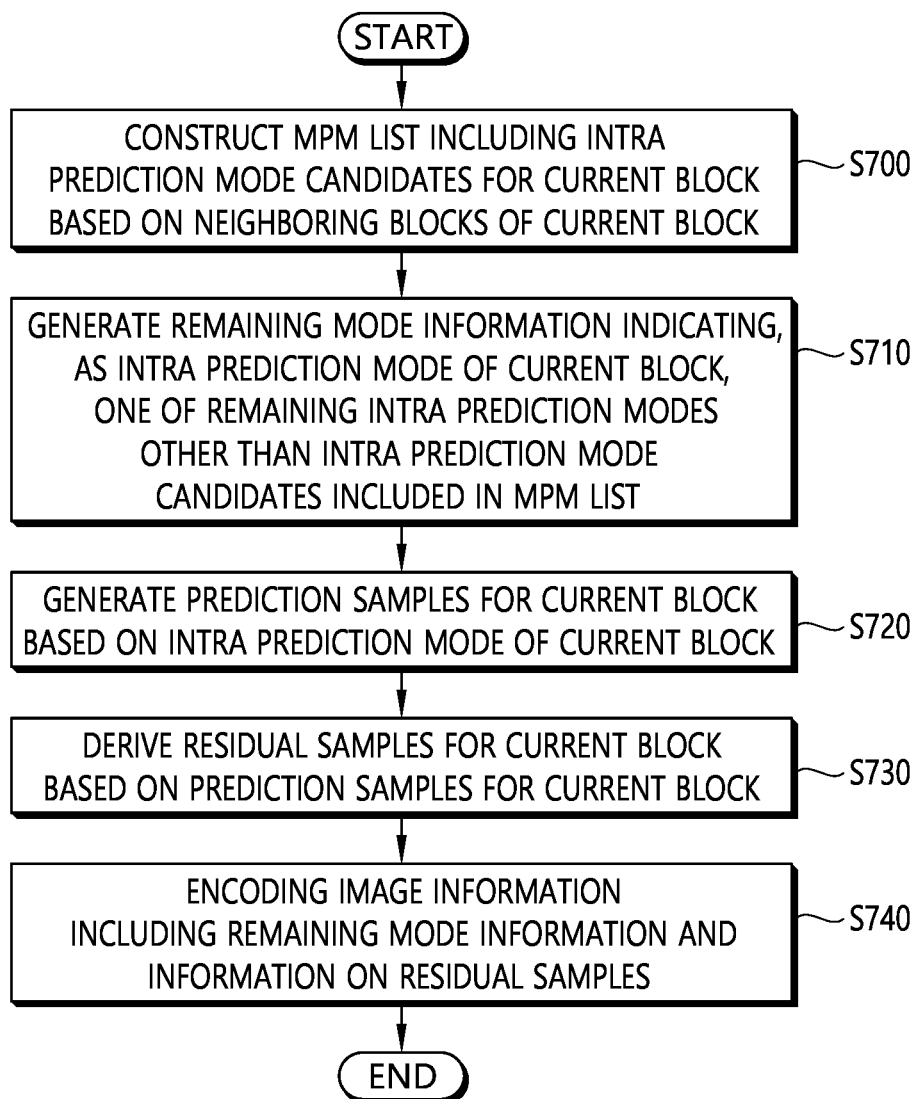
FIG. 7 is a flowchart showing operation of an encoding apparatus according to an example.
Figure 8:
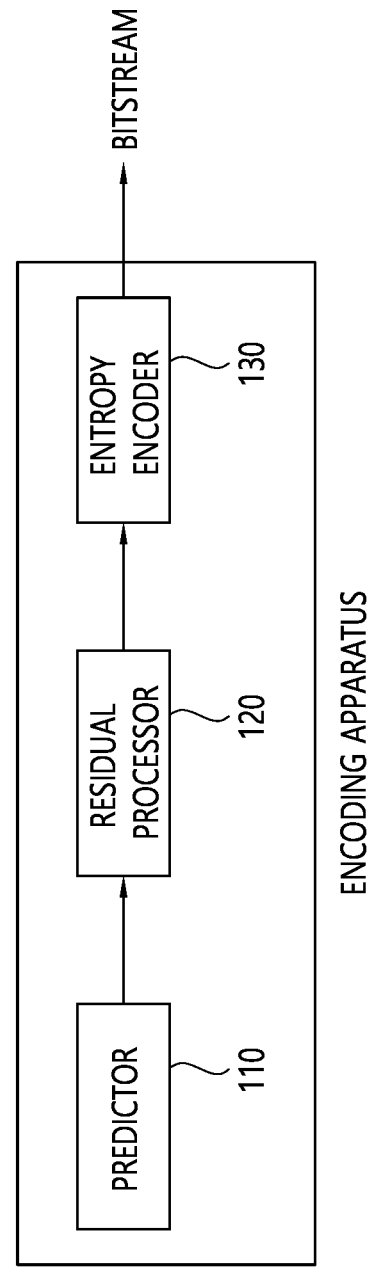
FIG. 8 is a block diagram showing a configuration of an encoding apparatus according to an example.

FIG. 7 is a flowchart showing operation of an encoding apparatus according to an example, and FIG. 8 is a block diagram showing configuration of an encoding apparatus according to an example.

Figure 9:
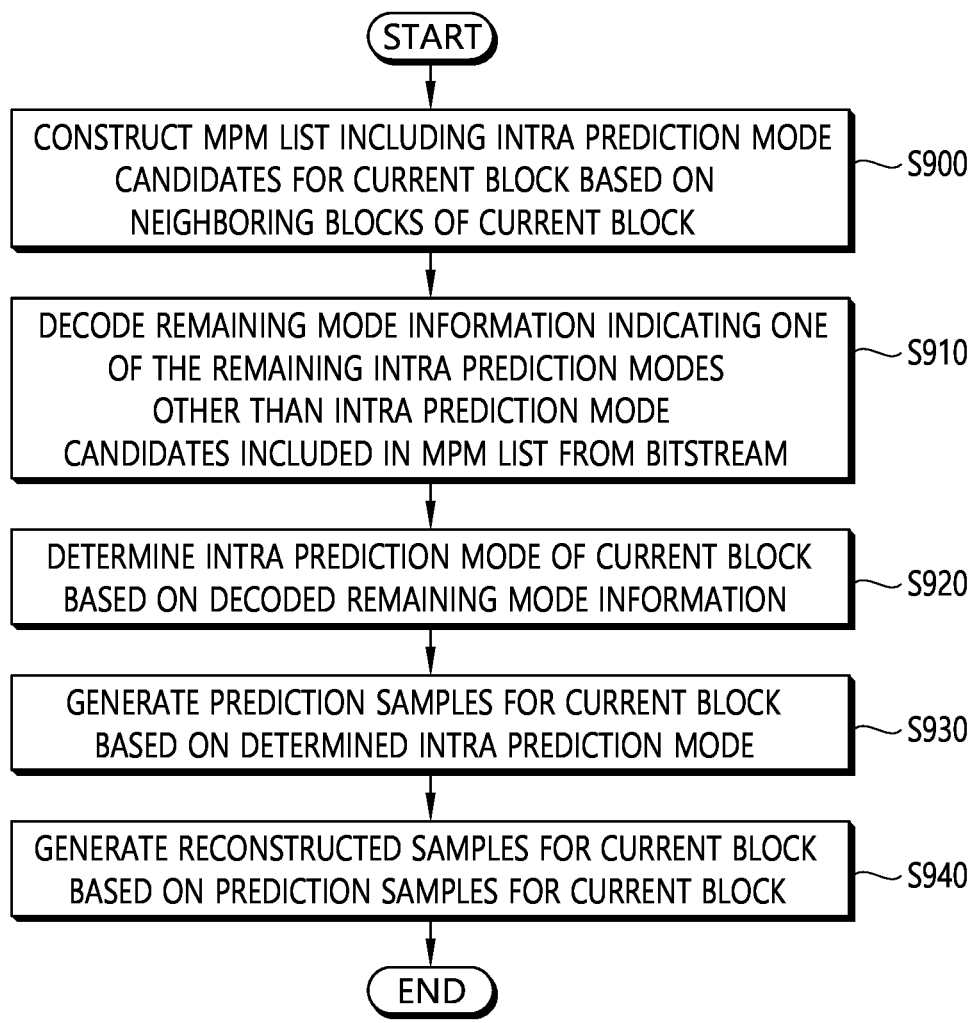
FIG. 9 is a flowchart showing operation of a decoding apparatus according to an example.
Figure 10:
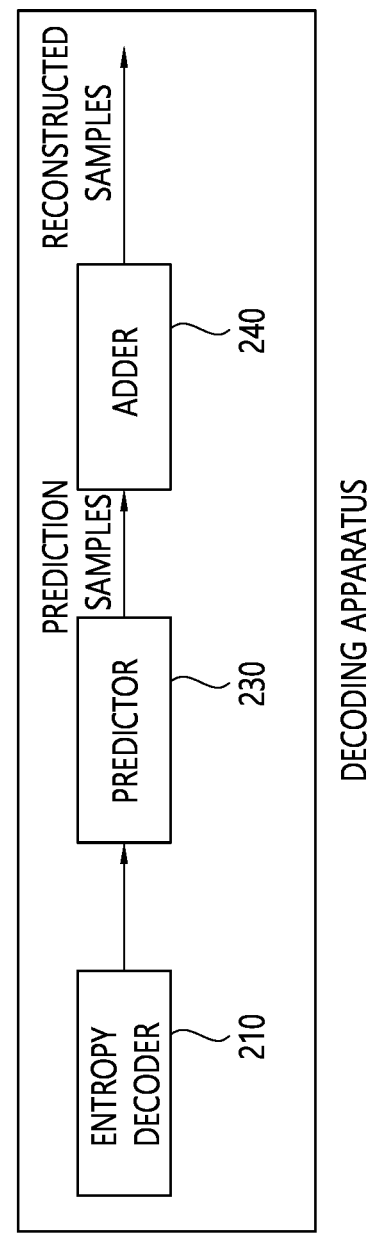
FIG. 10 is a block diagram showing a configuration of a decoding apparatus according to an example.

The encoding apparatus according to FIGS. 7 and 8 may perform operations corresponding to those of a decoding apparatus according to FIGS. 9 and 10. Therefore, operations of the decoding apparatus to be described later with reference to FIGS. 9 and 10 may be likely applied to the encoding apparatus according to FIGS. 7 and 8.

Each step disclosed in FIG. 7 may be performed by the encoding apparatus 100 disclosed in FIG. 1. More specifically, S700 and S720 may be performed by the predictor 110 disclosed in FIG. 1, S710 may be performed by the predictor 110 and/or the entropy encoder 130 disclosed in FIG. 1, S730 may be performed by the residual processor 120 disclosed in FIG. 1, and S740 may be performed by the entropy encoder 130 disclosed in FIG. 1. Further, operations according to S700 to S740 are based on some of contents described above with reference to FIGS. 3 to 6. Therefore, an explanation for the specific content duplicated with contents described above with reference to FIG. 1, and 3 to 6 will be omitted or made briefly.

As shown in FIG. 8, the encoding apparatus according to an example may include a predictor 110, a residual processor 120, and an entropy encoder 130. However, in some cases, all of the components shown in FIG. 8 may not be essential components of the encoding apparatus, and the encoding apparatus may be implemented by more or less components than those shown in FIG. 8.

In the encoding apparatus according to an example, the predictor 110, the residual processor 120, and the entropy encoder 130 may be implemented by separate chips, or at least two or more components may be implemented by a single chip.

The encoding apparatus according to an example may construct a Most Probable Modes (MPM) list including intra prediction mode candidates for the current block based on neighboring blocks of the current block (S700). More specifically, the predictor 110 of the encoding apparatus may construct the MPM list including intra prediction mode candidates for the current block based on neighboring blocks of the current block.

The encoding apparatus according to an example may generates remaining mode information indicating, as an intra prediction mode of the current block, one of remaining intra prediction modes other than the intra prediction mode candidates included in the MPM list (S710). More specifically, the predictor 110 and/or the entropy encoder 130 of the encoding apparatus may generate the remaining mode information which indicates, as the intra prediction mode of the current block, one of the remaining intra prediction modes other than the intra prediction mode candidates included in the MPM list.

The encoding apparatus according to an example may generate prediction samples for the current block based on the intra prediction mode of the current block (S720). More specifically, the predictor 110 of the encoding apparatus may generate the prediction samples for the current block based on the intra prediction mode of the current block.

The encoding apparatus according to an example may derive residual samples for the current block based on the prediction samples for the current block (S730). More specifically, the residual processor 120 of the encoding apparatus may derive the residual samples for the current block based on the prediction samples for the current block.

The encoding apparatus according to an example may encode image information including information on the residual samples and the remaining mode information (S740). More specifically, the entropy encoder 130 of the encoding apparatus may encode the image information including the information on the residual samples and the remaining mode information.

In an example, the remaining mode information included in the image information may be encoded based on the truncated binary code.

According to the encoding apparatus and an operation method of the encoding apparatus of FIGS. 7 and 8, the encoding apparatus may construct an MPM list including intra prediction mode candidates for the current block based on neighboring blocks of the current block (S700), generate remaining mode information indicating, as the intra prediction mode of the current block, one of the remaining intra prediction modes other than the intra prediction mode candidates included in the MPM list (S710), generate prediction samples for the current block based on the intra prediction mode of the current block (S720), derive residual samples for the current block based on the prediction samples for the current block (S730), and encode image information including information on the residual samples and the remaining mode information (S740), wherein the remaining mode information included in the image information is encoded based on a truncated binary code. That is, according to FIGS. 7 and 8, the remaining mode information indicating one of the remaining intra prediction modes not included in the MPM list can be efficiently coded based on the truncated binary code, and thus, when the number of intra prediction modes is large, overhead induced by signaling of information on the intra prediction mode can be effectively reduced.

FIG. 9 is a flowchart showing operation of a decoding apparatus according to an example, and FIG. 10 is a block diagram showing configuration of a decoding apparatus according to an example.

Each of steps disclosed in FIG. 9 may be performed by the decoding apparatus 200 disclosed in FIG. 2. More specifically, S900, S920, and S930 may be performed by the predictor 230 disclosed in FIG. 2, S910 may be performed by the entropy decoder 210 disclosed in FIG. 2, and S930 may be performed by the adder 240 disclosed in FIG. 2. Further, operations according to S900 to S940 are based on some of contents described above with reference to FIGS. 3 to 6. Therefore, an explanation for the specific content duplicated with contents described above with reference to FIGS. 2 to 6 will be omitted or made briefly.

As shown in FIG. 10, the decoding apparatus according to an example may include the entropy decoder 210, the predictor 230, and the adder 240. However, in some cases, all of the components shown in FIG. 10 may not be essential components of the decoding apparatus, and the decoding apparatus may be implemented by more or less components than those shown in FIG. 10.

In the decoding apparatus according to an example, the entropy decoder 210, the predictor 230, and the adder 240 may be implemented by separate chips, or at least two or more components may be implemented by a single chip.

The decoding apparatus according to an example may construct a Most Probable Modes (MPM) list including intra prediction mode candidates for the current block based on neighboring blocks of the current block (S900). More specifically, the predictor 230 of the decoding apparatus may construct the MPM list including intra prediction mode candidates (may also be referred to as MPM, or MPM candidates) for the current block based on neighboring blocks of the current block.

The decoding apparatus according to an example may decode remaining mode information indicating one of remaining intra prediction modes other than the intra prediction mode candidates included in the MPM list from a bitstream(S910). More specifically, the entropy decoder 210 of the decoding apparatus may decode the remaining mode information indicating one of the remaining intra prediction modes other than the intra prediction mode candidates included in the MPM list from the bitstream.

In an example, the intra prediction mode candidates and the remaining intra prediction modes may be included in a list and may be sorted based on a predetermined order. The list may be referred to as INTRA_MODE_MAP.

In an example, the predetermined order may be based on a use frequency or a selection probability of each of the intra prediction mode candidates and the remaining intra prediction modes.

In an example, the predetermined order may be based on intra prediction mode numbers and offset values of the intra prediction mode candidates.

In an example, the remaining intra prediction modes may be included in a list and may be sorted based on a predetermined order.

In an example, the predetermined order may be an ascending order based on an intra prediction mode number of each of the remaining intra prediction modes.

In an example, the predetermined order is based on a use frequency or a selection probability of each of the remaining intra prediction modes.

In an example, the predetermined order may be based on intra prediction mode numbers and offset values of the intra prediction mode candidates.

In an example, the offset values may include a first offset value, a second offset value, a third offset value, and a fourth offset value. When the number of the intra prediction mode candidates is 6 and the intra prediction mode numbers of the intra prediction mode candidates are a, b, c, d, e, and f in order, an intra prediction mode whose intra prediction mode number is a− the first offset value, an intra prediction mode whose intra prediction mode number is a+ the first offset value, an intra prediction mode whose intra prediction mode number is b− the first offset value, an intra prediction mode whose intra prediction mode number is b+ the first offset value, an intra prediction mode whose intra prediction mode number is c− the first offset value, an intra prediction mode whose intra prediction mode number is c+ the first offset value, an intra prediction mode whose intra prediction mode number is d− the first offset value, an intra prediction mode whose intra prediction mode number is d+ the first offset value, an intra prediction mode whose intra prediction mode number is e− the first offset value, an intra prediction mode whose intra prediction mode number is e+ the first offset value, an intra prediction mode whose intra prediction mode number is f− the first offset value, an intra prediction mode whose intra prediction mode number is f+ the first offset value, an intra prediction mode whose intra prediction mode number is a− the second offset value, an intra prediction mode whose intra prediction mode number is a+ the second offset value, . . . , an intra prediction mode whose intra prediction mode number is f− the fourth offset value, and an intra prediction mode whose intra prediction mode number is f+ the fourth offset value may be sorted in this order in said list. In this case, when an invalid intra prediction mode number exists among the intra prediction mode numbers to which the offset values are summed, the intra prediction mode according to the invalid intra prediction mode number may be excepted from the list, and the offset values may not be applied to an intra non-directional mode among the intra prediction mode candidates. The list may also be referred to as TBC_LIST.

In an example, the first offset value may be 1, the second offset value may be 2, the third offset value may be 3, and the fourth offset value may be 4.

The decoding apparatus according to an example may determine an intra prediction mode of the current block based on the decoded remaining mode information (S920). More specifically, the predictor 230 of the decoding apparatus may determine the intra prediction mode of the current block based on the decoded remaining mode information.

The decoding apparatus according to an example may generate prediction samples for the current block based on the determined intra prediction mode (S930). More specifically, the predictor 230 of the decoding apparatus may generate prediction samples for the current block based on the determined intra prediction mode.

The decoding apparatus according to an example may generate reconstructed samples for the current block based on the prediction samples for the current block (S940). More specifically, the adder 240 of the decoding apparatus may generate reconstructed samples for the current block based on the prediction samples for the current block.

In an example, the remaining mode information may be decoded based on a truncated binary code.

In an example, a bit number of the truncated binary code for first L first intra prediction modes of the remaining intra prediction modes is k, a bit number of the truncated binary code for second intra prediction modes resulting from excepting the first L first intra prediction modes from among the remaining intra prediction modes is k+1, and Equation 3 below is applied between the L and the k, $$L=2^{k+1}-u \qquad \text{[Equation 3]}$$

In Equation 3, u may represent the total number of the remaining intra prediction modes.

In an example, the L may be 3, the k may be 5, and the u may be 61.

In an example, the truncated binary codes for the first intra prediction modes may be 00000, 00001 and 00010, respectively, and the truncated binary codes for the second intra prediction modes may be 000110, 000111, 001000, . . . , 111111, respectively.

According to the decoding apparatus and the operation method of the decoding apparatus of FIGS. 9 and 10, the decoding apparatus constructs a Most Probable Modes (MPM) list including intra prediction mode candidates for the current block based on neighboring blocks of a current block (S900), decodes remaining mode information indicating one of the remaining intra prediction modes other than the intra prediction mode candidates included in the MPM list from a bitstream (S910), determines an intra prediction mode of the current block based on the decoded remaining mode information (S920), generates prediction samples for the current block based on the determined intra prediction mode (S930), and generates reconstructed samples for the current block based on the prediction samples for the current block (S940), wherein the remaining mode information is decoded based on a truncated binary code. That is, according to FIGS. 9 and 10, the remaining mode information indicating one of the remaining intra prediction modes not included in the MPM list can be efficiently coded based on the truncated binary code, and thus, when the number of intra prediction modes is large, overhead induced by signaling of information on the intra prediction mode can be effectively reduced.

The examples described in the present disclosure may be embodied and performed on a processor, a microprocessor, a controller or a chip. For example, functional units shown in each drawing may be embodied and performed on a computer, a processor, a microprocessor, a controller or a chip.

Further, a decoder and an encoder to which the present disclosure is applied, may be included in a multimedia broadcasting transceiver, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an over the top (OTT) video device, an Internet streaming service providing device, a three-dimensional (3D) video device, a video telephony video device, and a medical video device, and may be used to process a video signal or a data signal. For example, the over the top (OTT) video device may include a game console, a Blu-ray player, an Internet access TV, a Home theater system, a smart phone, a Tablet PC, a digital video recorder (DVR) and the like.

In addition, a processing method to which the examples of the present disclosure are applied, may be produced in the form of a program executed by a computer, and be stored in a computer-readable recording medium. Multimedia data having a data structure according to the present disclosure may also be stored in a computer-readable recording medium. The computer-readable recording medium includes all kinds of storage devices and distributed storage devices in which computer-readable data are stored. The computer-readable recording medium may include, for example, a Blu-ray Disc (BD), a universal serial bus (USB), a ROM, a PROM, an EPROM, an EEPROM, a RAM, a CD-ROM, a magnetic tape, a floppy disk, and an optical data storage device. Further, the computer-readable recording medium includes media embodied in the form of a carrier wave (for example, transmission over the Internet). In addition, a bitstream generated by the encoding method may be stored in a computer-readable recording medium or transmitted through a wired or wireless communication network.

Additionally, the examples of the present disclosure may be embodied as a computer program product by program codes, and the program codes may be executed on a computer by the examples of the present disclosure. The program codes may be stored on a computer-readable carrier.

Figure 11:
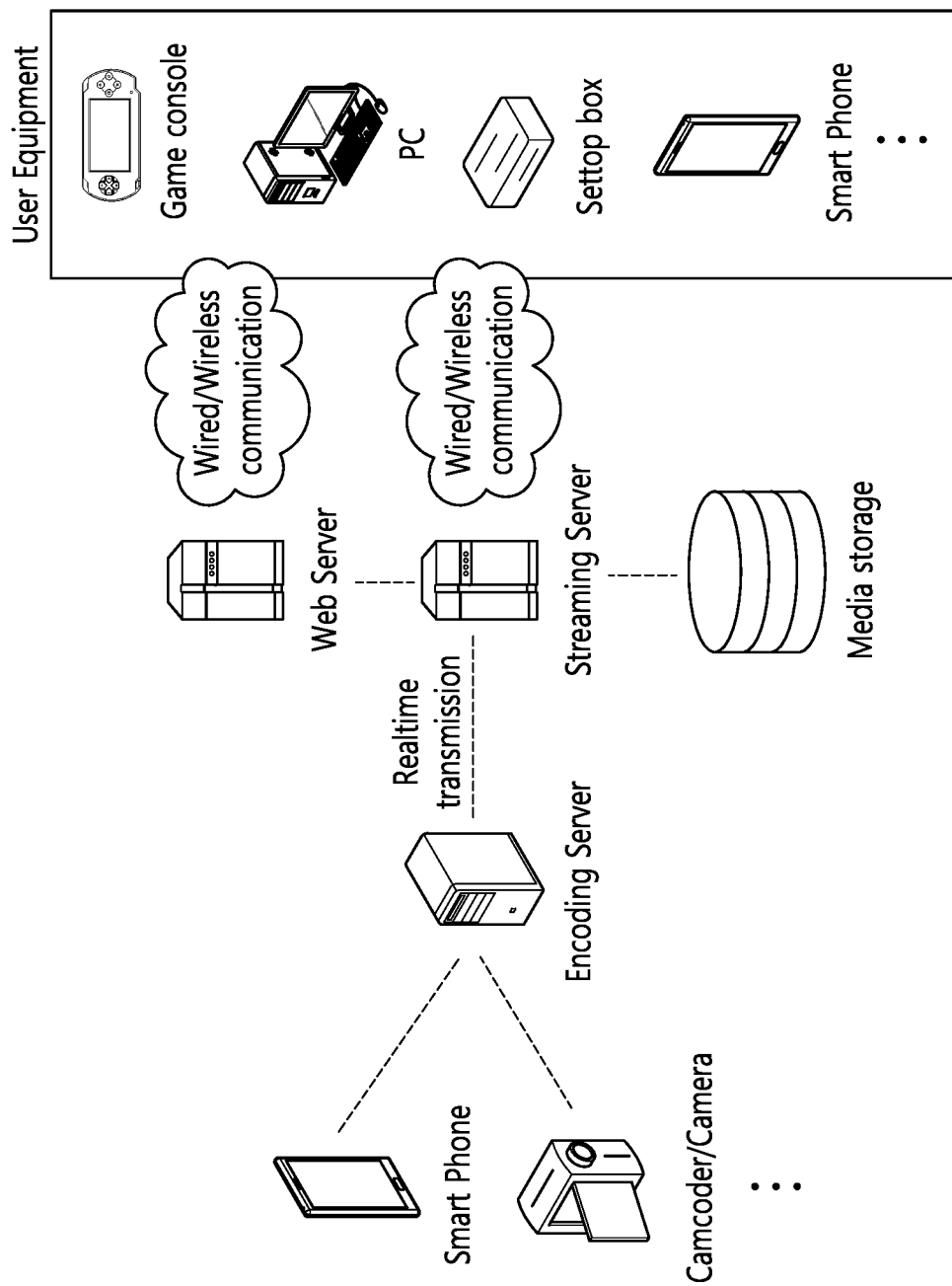
FIG. 11 is a diagram showing a structural diagram of a contents streaming system according to an example.

FIG. 11 is a diagram showing a structural diagram of a contents streaming system according to an example.

The contents streaming system to which the present disclosure is applied may largely include an encoding server, a streaming server, a web server, a media storage, a user equipment, and a multimedia input device.

The encoding server functions to compress to digital data the contents input from the multimedia input devices, such as the smart phone, the camera, the camcoder and the like, to generate a bitstream, and to transmit it to the streaming server. As another example, in a case where the multimedia input device, such as, the smart phone, the camera, the camcoder or the like, directly generates a bitstream, the encoding server may be omitted.

The bitstream may be generated by an encoding method or a bitstream generation method to which the present disclosure is applied, and the streaming server may store the bitstream temporarily during a process to transmit or receive the bitstream.

The streaming server transmits multimedia data to the user equipment based on of a user's request through the web server, which functions as an instrument that informs a user of what service there is. When the user requests a service which the user wants, the web server transfers the request to the streaming server, and the streaming server transmits multimedia data to the user. In this regard, the contents streaming system may include a separate control server, and in this case, the control server functions to control commands/responses between respective equipments in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the contents streaming system may be operated as a distributed server, and in this case, data received by each server may be processed in distributed manner.

The above-described method according to this document may be implemented in a software form, and the encoding apparatus and/or the decoding apparatus according to this document may be included in an apparatus that performs image processing of, for example, a TV, a computer, a smartphone, a set-top box, a display device, and the like.

The above-described each part, module, or unit may be a processor or a hardware part that executes successive procedures stored in a memory (or storage unit). Each step described in the foregoing embodiment may be performed by a processor or hardware parts. Each module/block/unit described in the foregoing embodiment may operate as hardware/processor. Further, methods suggested by this document may be executed as a code. The code may be written in a processor readable storage medium and may be thus read by a processor provided by an apparatus.

In the above-described embodiments, methods are described based on of a flowchart using a series of steps or blocks, but this document is not limited to the sequence of steps. Some steps may occur simultaneously or in a different sequence than the steps described above. Further, those skilled in the art will understand that the steps shown in the sequence diagram are not exclusive, that other steps may be included, or that one or more steps in the flowchart may be deleted without affecting the scope of this document.

When the embodiments of this document are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. An image decoding method performed by a decoding apparatus, the method comprising:
   receiving prediction related information and residual information from a bitstream;
   determining that an intra prediction is applied for a current block based on the prediction related information;
   constructing a Most Probable Mode (MPM) list including intra prediction mode candidates for the current block based on neighboring blocks of the current block;
   decoding remaining mode information indicating one of remaining intra prediction modes not included in the MPM list from the bitstream;
   deriving an intra prediction mode of the current block based on the remaining mode information;
   generating prediction samples for the current block based on the intra prediction mode;
   deriving transform coefficients based on the residual information;
   generating residual samples for the current block based on the transform coefficients; and generating reconstructed samples for the current block based on the prediction samples for the current block and the residual samples for the current block, wherein the neighboring blocks of the current block include a left neighboring block and an upper neighboring block, wherein the remaining mode information is decoded based on a truncated binary code, wherein a number of bits of the truncated binary code for first intra prediction modes of the remaining intra prediction modes is k, and a number of bits of the truncated binary code for second intra prediction modes excepting the first intra prediction modes among the remaining intra prediction modes is k+1, wherein a number of the first intra prediction modes is L, and wherein a following equation is applied between the k and u, $$k=\text{floor}(\log 2u)$$

wherein the u represents a total number of the remaining intra prediction modes.

2. An image encoding method performed by an encoding apparatus, the method comprising:

determining that an intra prediction is applied for a current block;

constructing a Most Probable Mode (MPM) list including intra prediction mode candidates for the current block based on neighboring blocks of the current block;

generating remaining mode information indicating, as an intra prediction mode of the current block, one of remaining intra prediction modes not included in the MPM list;

generating prediction samples for the current block based on the intra prediction mode of the current block;

deriving residual samples for the current block based on the prediction samples for the current block;

deriving transform coefficients based on the residual samples;

generating residual information based on the transform coefficients; and encoding image information including the residual information and the remaining mode information, wherein the neighboring blocks of the current block include a left neighboring block and an upper neighboring block, wherein the remaining mode information included in the image information is encoded based on a truncated binary code, wherein a number of bits of the truncated binary code for first intra prediction modes of the remaining intra prediction modes is k, and a number of bits of the truncated binary code for second intra prediction modes excepting the first intra prediction modes among the remaining intra prediction modes is k+1, wherein a number of the first intra prediction modes is L, and wherein a following equation is applied between the k and u, $$k=\text{floor}(\log 2u)$$

wherein the u represents a total number of the remaining intra prediction modes.

3. A transmission method of data for an image, the method comprising:

obtaining a bitstream for the image, wherein the bitstream is generated based on determining that an intra prediction is applied for a current block, constructing a Most Probable Mode (MPM) list including intra prediction mode candidates for the current block based on neighboring blocks of the current block, generating remaining mode information indicating, as an intra prediction mode of the current block, one of remaining intra prediction modes not included in the MPM list, generating prediction samples for the current block based on the intra prediction mode of the current block, deriving residual samples for the current block based on the prediction samples for the current block, deriving transform coefficients based on the residual samples, generating residual information based on the transform coefficients, and encoding image information including the residual information and the remaining mode information; and transmitting the data comprising the bitstream, wherein the neighboring blocks of the current block include a left neighboring block and an upper neighboring block, wherein the remaining mode information included in the image information is encoded based on a truncated binary code, wherein a number of bits of the truncated binary code for first intra prediction modes of the remaining intra prediction modes is k, and a number of bits of the truncated binary code for second intra prediction modes excepting the first intra prediction modes among the remaining intra prediction modes is k+1, wherein a number of the first intra prediction modes is L, and wherein a following equation is applied between the k and u, $$k=\text{floor}(\log 2u)$$

wherein the u represents a total number of the remaining intra prediction modes.

* * * * *